United States Patent
Chauhan

(10) Patent No.: US 11,859,848 B2
(45) Date of Patent: Jan. 2, 2024

(54) BUILDING CONTROL SYSTEM USING A CONTROL DEVICE POSITION AS A PROXY FOR STATIC PRESSURE IN A CONDUIT

(71) Applicant: Johnson Controls Tyco IP Holdings LLP, Milwaukee, WI (US)

(72) Inventor: Amit Chauhan, Wardha (IN)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 17/362,466

(22) Filed: Jun. 29, 2021

(65) Prior Publication Data
US 2021/0404690 A1    Dec. 30, 2021

(30) Foreign Application Priority Data
Jun. 30, 2020   (IN) .............................. 202021027796

(51) Int. Cl.
*F24F 11/65*   (2018.01)
*F24F 11/64*   (2018.01)
(Continued)

(52) U.S. Cl.
CPC ................ *F24F 11/65* (2018.01); *F24F 3/02* (2013.01); *F24F 11/64* (2018.01); *F24F 2140/10* (2018.01)

(58) Field of Classification Search
CPC .... F24F 11/65; F24F 11/64; F24F 3/02; F24F 2140/10; F24F 11/0001; F24F 11/30; G05D 7/0635; F23N 1/022
See application file for complete search history.

(56) References Cited

U.S. PATENT DOCUMENTS 4,500,950 A * 2/1985 Putman ................... C21B 5/006
                                                    700/44
4,552,058 A * 11/1985 Wooldridge ............. F24F 11/75
                                                    454/238
(Continued)

FOREIGN PATENT DOCUMENTS

WO   WO-2020146387 A1 *  7/2020 ............. F04D 25/06

OTHER PUBLICATIONS

Tan, H. and Dexter, A., 2006. Estimating airflow rates in air-handling units from actuator control signals. Building and environment, 41(10), pp. 1291-1298. (Year: 2006).*

(Continued)

*Primary Examiner* — Alicia M. Choi
(74) *Attorney, Agent, or Firm* — Foley & Lardner LLP

(57) ABSTRACT

An environmental control system for a building is shown. The system includes a control device operable affect a static pressure in a conduit, a building device operable to affect a flow rate of a fluid through the conduit, and a controller including a processing circuit configured to perform a volumetric control process to generate a control signal for the drive device. The processing circuit is further configured to receive an operating position signal of the control device. The processing circuit is further configured to determine an estimated static pressure level within the duct using the operating position signal of the control device and update the control signal based on the estimated static pressure level determined using the operating position. The processing circuit is further configured to operate the drive device based on the updated control signal to affect the flow rate of the fluid.

20 Claims, 10 Drawing Sheets

(51) Int. Cl.
*F24F 3/02* (2006.01)
*F24F 140/10* (2018.01)

(56) References Cited

U.S. PATENT DOCUMENTS

| | | | | |
|---|---|---|---|---|
| 2011/0284091 A1* | 11/2011 | Livchak | ............... | F24C 15/2042 |
| | | | | 126/299 R |
| 2012/0063606 A1* | 3/2012 | Furuya | ............... | G01H 3/14 |
| | | | | 381/56 |
| 2015/0079894 A1* | 3/2015 | Zimmerman | ............... | F24F 7/003 |
| | | | | 454/255 |
| 2015/0354845 A1* | 12/2015 | Brown | ............... | F24F 11/72 |
| | | | | 236/51 |
| 2016/0154405 A1* | 6/2016 | Goldschmidt | ............... | G05B 13/026 |
| | | | | 700/282 |
| 2018/0292103 A1* | 10/2018 | Modera | ............... | F24F 3/02 |
| 2019/0195527 A1* | 6/2019 | Puranen | ............... | F24F 3/044 |

OTHER PUBLICATIONS

Multiple-zone VAV systems. "Finding the Right Balance for VAV Energy Savings", Trane Engineers Newsletter, vol. 45-3. ADM-APN0559-EN .(Sep. 2016) 8 pages.

\* cited by examiner

BUILDING CONTROL SYSTEM USING A CONTROL DEVICE POSITION AS A PROXY FOR STATIC PRESSURE IN A CONDUIT

CROSS-REFERENCE TO RELATED PATENT APPLICATIONS

This application claims priority of India Priority Application 202021027796, filed Jun. 30, 2020, the entire disclosure of which is incorporated herein by reference in its entirety.

BACKGROUND

The present disclosure relates generally to the field of building equipment for a building and more particularly to controlling the building equipment based on an operating position of a control device in a conduit.

Traditional volumetric control systems that utilize static pressure control or volumetric control suffer from a variety of inefficiencies and complications. For example, determining an ideal location in a conduit (e.g., a duct, a pipe, etc.) to install a sensor to measure static pressure can be difficult. If a non-optimal location is used, measured static pressures may be inaccurate and unreliable. Further, traditional duct static control systems may require intensive proportional-integral-derivative (PID) tuning for the system to operate correctly. In terms of traditional volumetric control systems, there may be a complete disregard of a static pressure in the conduit which may be useful for operating building equipment.

SUMMARY

One implementation of the present disclosure is an environmental control system for a building. The system includes a control device operable affect a static pressure in a conduit. The system further includes a building device operable to affect a flow rate of a fluid through the conduit. The building device includes a drive device that affects operation of the building device. The system further includes a controller including a processing circuit, the processing circuit configured to perform a volumetric control process to generate a control signal for the drive device. The processing circuit is further configured to receive an operating position of the control device. The processing circuit is further configured to determine an estimated static pressure level within the duct using the operating position signal of the control device. The processing circuit is further configured to update the control signal based on the estimated static pressure level determined using the operating position signal and operate the drive device based on the updated control signal to affect the flow rate of the fluid.

In some embodiments, the control device is a damper of a variable air volume unit or a valve, the building device is an air handling unit or a pump, and the fluid is a gas or a liquid.

In some embodiments, updating the control signal based on the operating position further includes establishing a plurality of static pressure ranges based on a plurality of open control devices, the plurality of opening control devices comprising the control device. The system further includes determining whether the received operating position signal is indicative of the control device being open. The system further includes associating the indication of the control device being open with one of the plurality of static pressure ranges in which the building device operating. The system further includes adjusting the control signal based on the building device operating in the one of the plurality of static pressure ranges.

In some embodiments, updating the control signal based on the operating position further includes establishing a plurality of static pressure ranges based on a plurality of open control devices, the plurality of opening control devices comprising the control device. The system further includes determining a percentage to which the control device has been opened based on the received operating position signal. The system further includes associating the percentage to which the control device has been opened with one of the plurality of static pressure ranges in which the building device operating. The system further includes adjusting the control signal based on the building device operating in the one of the plurality of static pressure ranges.

In some embodiments, the processing circuit is further configured to perform a regression to identify a relationship between a low input/output (I/O) pair and a high I/O pair associated with the building device, wherein the low I/O pair and the high I/O pair describe a minimum value and a maximum value of the control signal for the building device. The processing circuit is further configured to update the control signal based on the relationship.

In some embodiments, the processing circuit is further configured to increase a setpoint associated with the static pressure in response to determining that a number of control devices opened about a predefined threshold exceeds a maximum limit. The processing circuit is further configured to decrease the setpoint in response to determining that the number of control devices is below a minimum limit. The processing circuit is further configured to maintain the setpoint in response to determining the number of control devices is between the minimum limit and the maximum limit, wherein the control signal is updated further based on the setpoint.

In some embodiments, the processing circuit is further configured to operate the control device based on the setpoint to affect the static pressure in the conduit. In some embodiments, the operating position of the control device acts as a proxy for the static pressure in the conduit.

In some embodiments, the control signal indicates at least one of a frequency value or a voltage value and the drive device provides the at least one of the frequency value or the voltage value to a component of the building device to affect a rotational speed of the component.

Another implementation of the present disclosure is a method for affecting a flow rate of fluid through a conduit. The method includes performing a volumetric control process to generate a control signal for a drive device of a building device, the building device operable to affect the flow rate of the fluid through the conduit. The method further includes receiving an operating position signal of a control device. The method further includes determining an estimated static pressure level within the duct using the operating position signal of the control device. The method further includes updating the control signal based on the estimated static pressure level determined using the operating position signal. The method further includes operating the drive device based on the updated control signal to affect the flow rate of the fluid.

In some embodiments, the control device is a variable air volume damper or a valve, the building device is an air handling unit or a pump, and the fluid is a gas or a liquid.

In some embodiments, updating the control signal based on the operating position further includes establishing a plurality of static pressure ranges based on a plurality of open control devices, the plurality of opening control devices comprising the control device. The system further includes determining whether the received operating position signal is indicative of the control device being open. The system further includes associating the indication of the control device being open with one of the plurality of static pressure ranges in which the building device operating. The system further includes adjusting the control signal based on the building device operating in the one of the plurality of static pressure ranges.

In some embodiments, updating the control signal based on the operating position further includes establishing a plurality of static pressure ranges based on a plurality of open control devices, the plurality of opening control devices comprising the control device. The system further includes determining a percentage to which the control device has been opened based on the received operating position signal. The system further includes associating the percentage to which the control device has been opened with one of the plurality of static pressure ranges in which the building device operating. The system further includes adjusting the control signal based on the building device operating in the one of the plurality of static pressure ranges.

In some embodiments, the method further includes performing a regression to identify a relationship between a low input/output (I/O) pair and a high I/O pair associated with the building device, wherein the low I/O pair and the high I/O pair describe a minimum value and a maximum value of the control signal for the building device. The method further includes updating the control signal based on the relationship.

In some embodiments, the method further includes increasing a setpoint associated with the static pressure in response to determining that a number of control devices opened about a predefined threshold exceeds a maximum limit. The method further includes decreasing the setpoint in response to determining that the number of control devices is below a minimum limit. The method further includes maintaining the setpoint in response to determining the number of control devices is between the minimum limit and the maximum limit, wherein the control signal is updated further based on the setpoint.

In some embodiments, the method further includes operating the control device based on the setpoint to affect the static pressure in the conduit. In some embodiments, the operating position of the control device acts as a proxy for the static pressure in the conduit.

In some embodiments, the control signal indicates at least one of a frequency value or a voltage value and the drive device provides the at least one of the frequency value or the voltage value to a component of the building device to affect a rotational speed of the component.

Another implementation of the present disclosure is a controller for affecting a flow rate of fluid through a conduit. The controller includes one or more processors and one or more non-transitory computer-readable media storing instructions that, when executed by the one or more processors, cause the one or more processors to perform operations. The operations include performing a volumetric control process to generate a control signal for a drive device of a building device, the building device operable to affect the flow rate of the fluid through the conduit. The operations further include receiving an operating position signal of a control device. The operations further include determining an estimated static pressure level within the duct using the operating position signal of the control device. The operations further include updating the control signal based on the estimated static pressure level determined using the operating position signal. The operations further include operating the drive device based on the updated control signal to affect the flow rate of the fluid.

In some embodiments, the control device is a variable air volume damper or a valve, the building device is an air handling unit or a pump, and the fluid is a gas or a liquid.

In some embodiments, updating the control signal based on the operating position further includes establishing a plurality of static pressure ranges based on a plurality of open control devices, the plurality of opening control devices comprising the control device. The system further includes determining whether the received operating position signal is indicative of the control device being open. The system further includes associating the indication of the control device being open with one of the plurality of static pressure ranges in which the building device operating. The system further includes adjusting the control signal based on the building device operating in the one of the plurality of static pressure ranges.

In some embodiments, updating the control signal based on the operating position further includes establishing a plurality of static pressure ranges based on a plurality of open control devices, the plurality of opening control devices comprising the control device. The system further includes determining a percentage to which the control device has been opened based on the received operating position signal. The system further includes associating the percentage to which the control device has been opened with one of the plurality of static pressure ranges in which the building device operating. The system further includes adjusting the control signal based on the building device operating in the one of the plurality of static pressure ranges.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
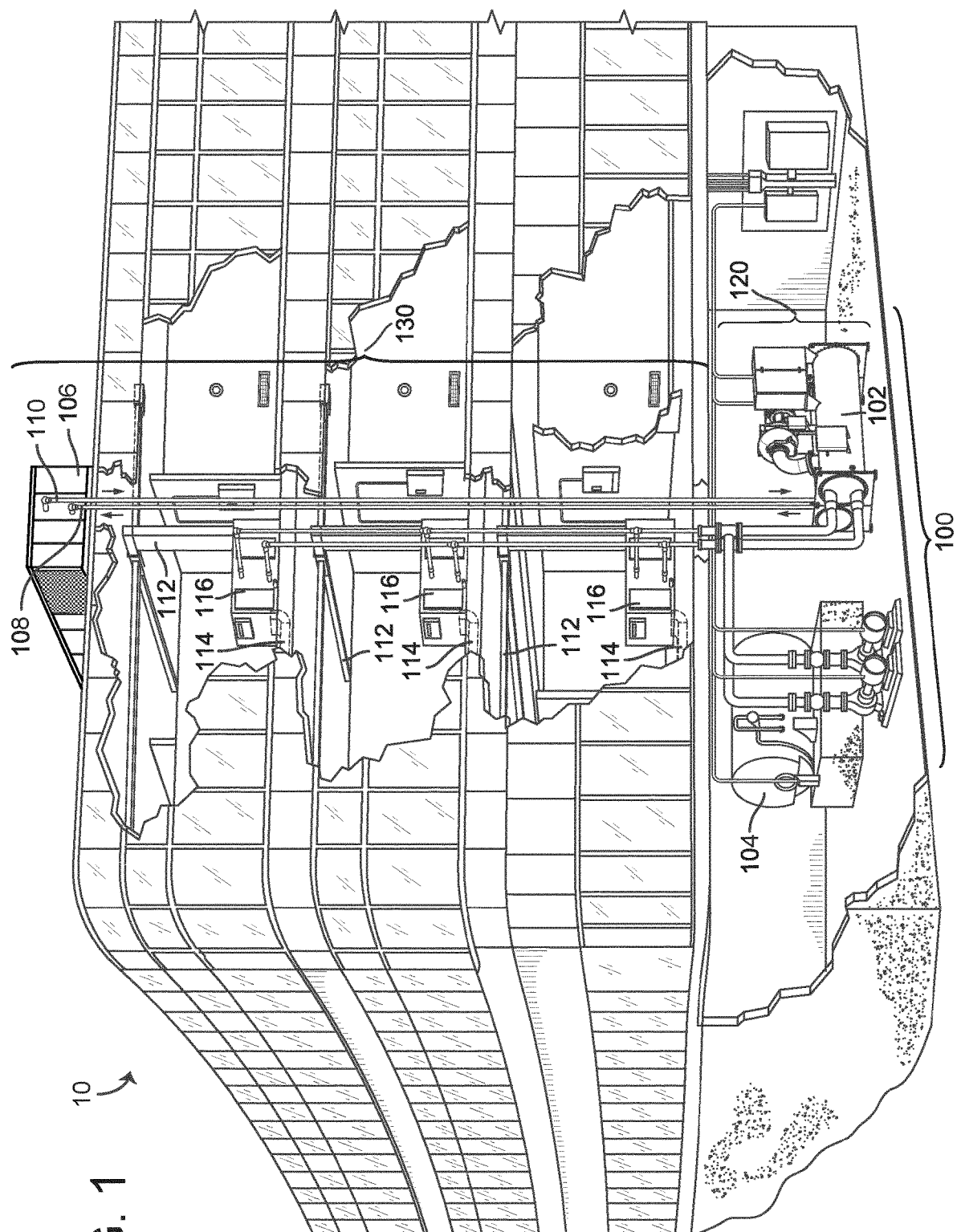
FIG. 1 is a drawing of a building equipped with a HVAC system, according to some embodiments.

Referring generally to the FIGURES, systems and methods for operating building devices based on positions of control devices in a conduit are shown and described, according to some embodiments. For example, the systems and methods described herein can be applied in an airside system for controlling an air handling unit (AHU) fan variable frequency drive (VFD) using a variable air volume (VAV) damper position as a proxy for static pressure in a duct. As another example, the systems and methods described herein can be applied in a waterside system for controlling a VFD of a pump by using a valve position as a proxy for differential pressure in a pipe. In some embodiments, damper positions, valve positions, or various other positions of HVAC devices may be used as a proxy for static pressure or differential pressure. In some embodiments, the HVAC device position (e.g., valve position, etc.) is used as a proxy for differential pressure when implemented in a closed loop system. More generally, the systems and methods described herein can be applied to regulate a flow of a fluid (e.g., air, water, etc.) through a conduit (e.g., a duct, a pipe, etc.) by utilizing a position of a control device (e.g., a VAV damper, a valve, etc.) as a proxy for static pressure in the conduit. Accordingly, it should be appreciated that description included herein with regard to a particular environmental control system (e.g., an airside system) is provided for sake of example and should not be interpreted as limiting on the present disclosure. The systems and methods described herein can be applied in a variety of environmental control systems that involve regulation of a fluid in a conduit.

With regard to an example airside system, the systems and methods may add VAV damper position feedback (e.g., as proxy to the duct static pressure) to traditional volumetric control logic. It should be noted that, in some embodiments, the AHUs described herein may include a variable speed drive (VSD) instead of and/or in addition to a VFD. However, VFDs are primarily referred to herein for consistency and ease of explanation.

Static pressure in a conduit can refer to a resistance to flow of a fluid in the conduit. For example, static pressure in a duct can describe a resistance to airflow within the duct. AHUs can operate to affect static pressure in ducts by providing airflow to the duct. Specifically, a VFD of an AHU can operate to move (e.g., rotate) a fan of the AHU to produce an airflow. However, if the duct static pressure is too high, the AHU may not be able to properly circulate air through the duct work. Failure to circulate air can result in, among other deficiencies, additional operating costs as air will not be able to reach spaces where the air is needed to fulfill a heating or cooling load.

Utilizing the VAV damper position as a proxy for the duct static pressure can provide a number of advantages over traditional volumetric control logic that utilizes the duct static pressure. For example, the proposed control logic can provide cost savings to control VFDs as a need for differential pressure transmitter (DPT) sensors installed in ductwork can be eliminated. Further, as fewer components are required, downtime and maintenance for the system can be reduced. Utilizing the VAV damper position can also eliminate issues that arise if no ideal location for mounting sensors to measure the duct static pressure can be identified. Even if no ideal location can be identified, utilizing the VAV damper position as the proxy can nonetheless provide a similar energy benefit as if the duct static pressure were known and used.

In experimental testing, utilizing the VAV damper position as the proxy for duct static pressure has been measured to result in an up to 21% reduction in AHU motor energy consumption. Utilizing the VAV damper position can also arrest duct noise and vibration, maintain flow across each VAV in a building system, increase overall equipment life, and can maintain static pressure in the duct. These benefits can result in significant cost and energy savings in building systems utilizing AHUs.

Building HVAC Systems and Building Management Systems

Figure 2:
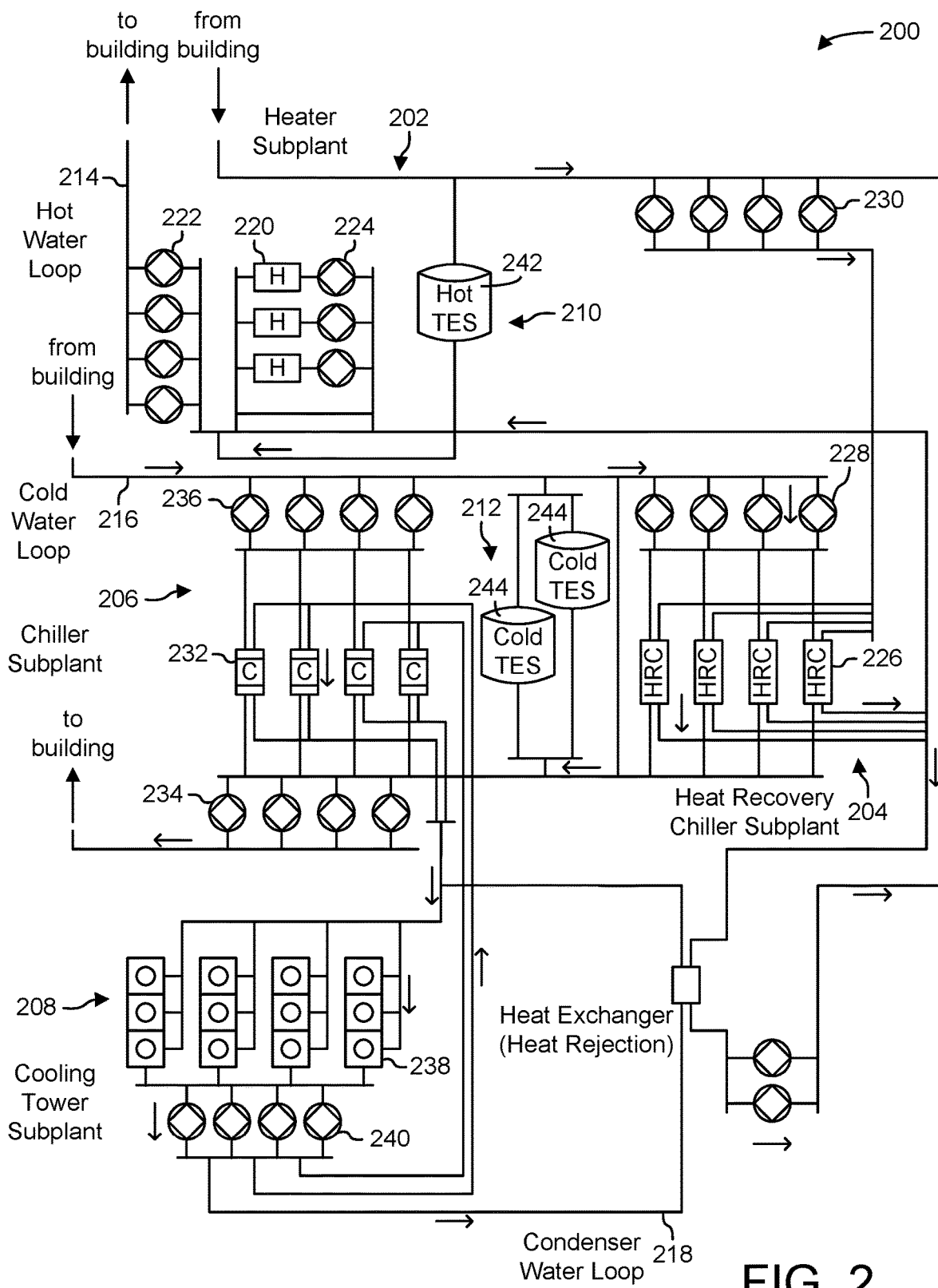
FIG. 2 is a block diagram of a waterside system which can be used to serve the heating or cooling loads of the building of FIG. 1, according to some embodiments.
Figure 3:
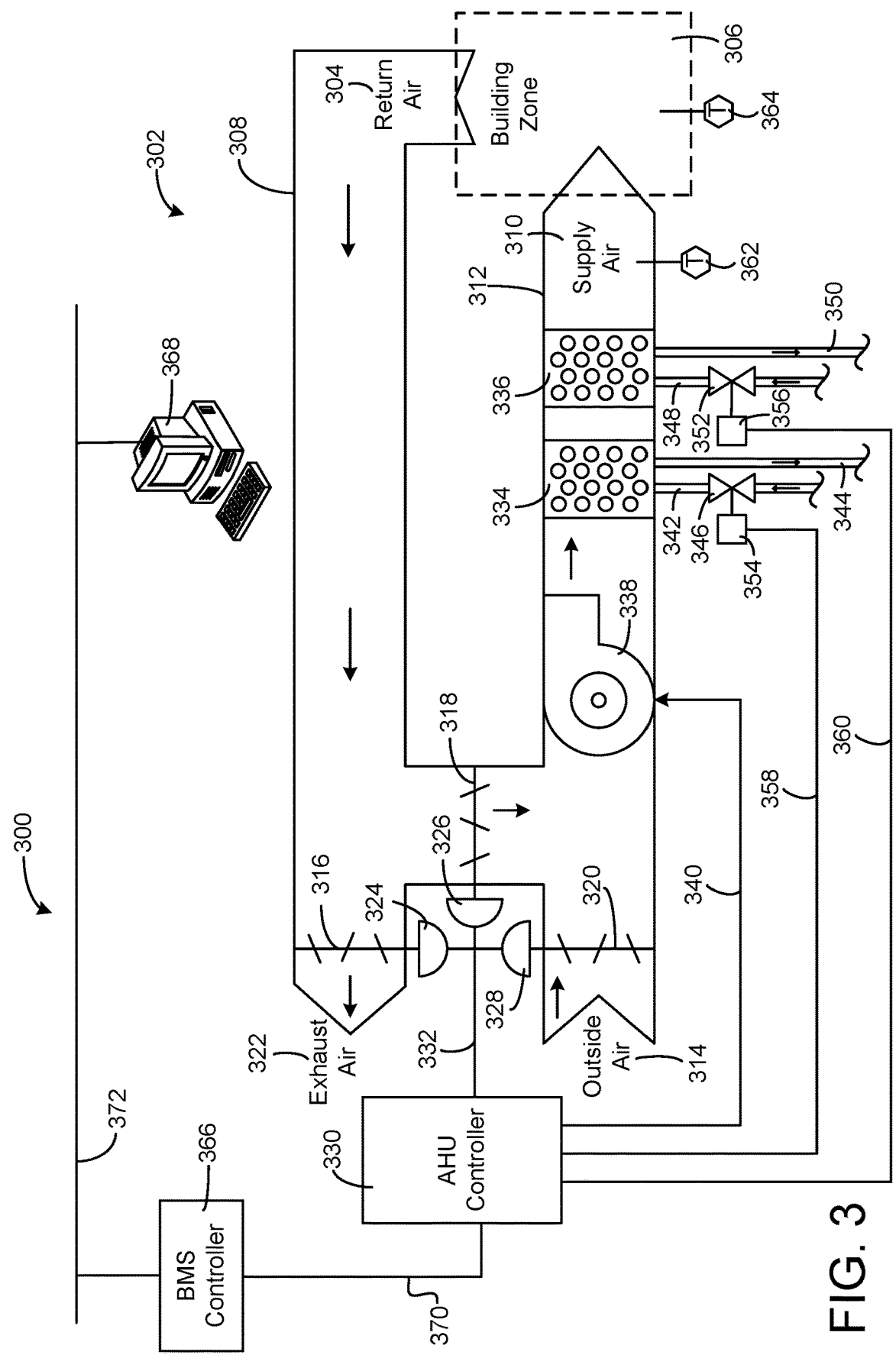
FIG. 3 is a block diagram of an airside system which can be used to serve the heating or cooling loads of the building of FIG. 1, according to some embodiments.
Figure 4:
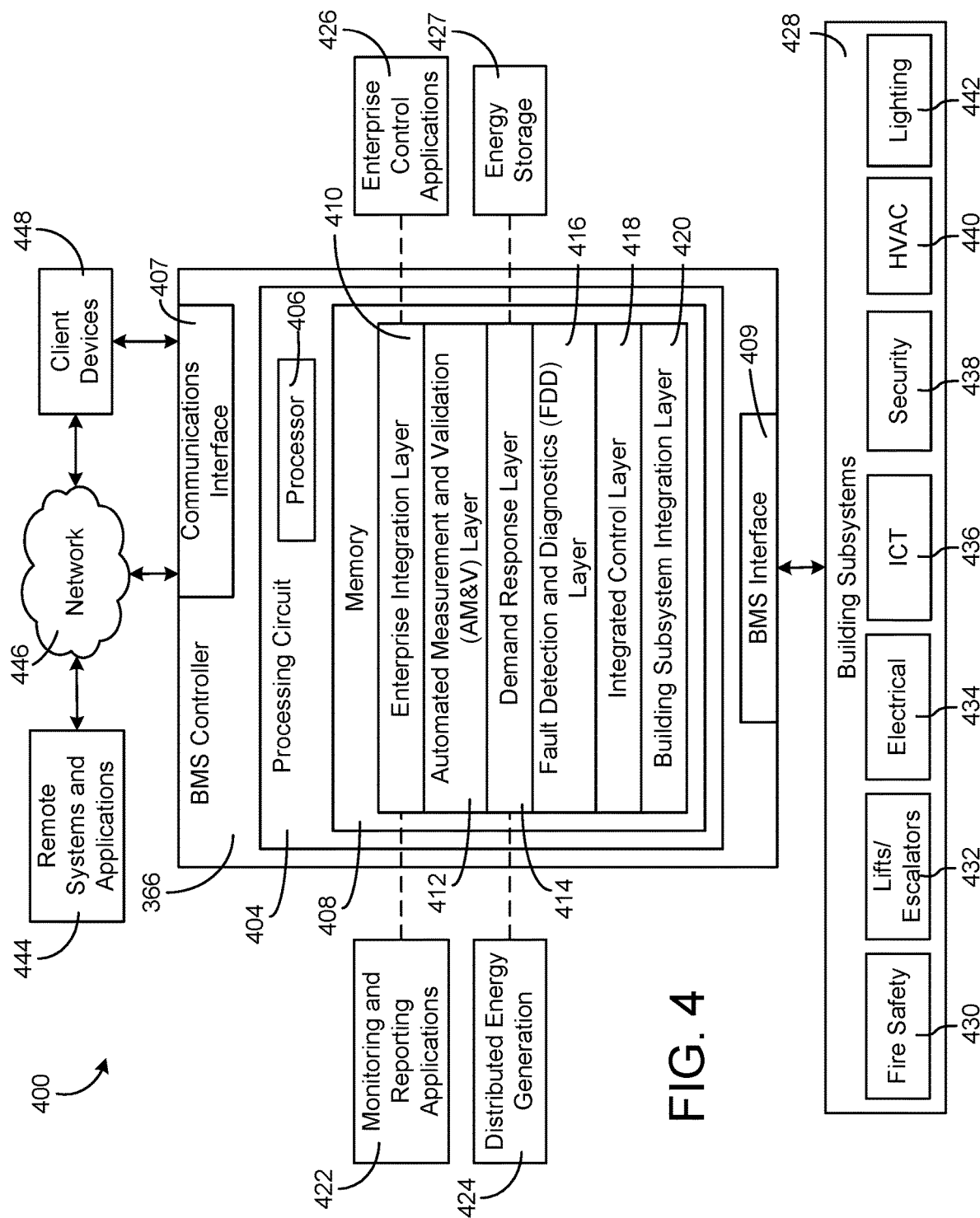
FIG. 4 is a block diagram of a building management system (BMS) which can be used to monitor and control the building of FIG. 1, according to some embodiments.
Figure 5:
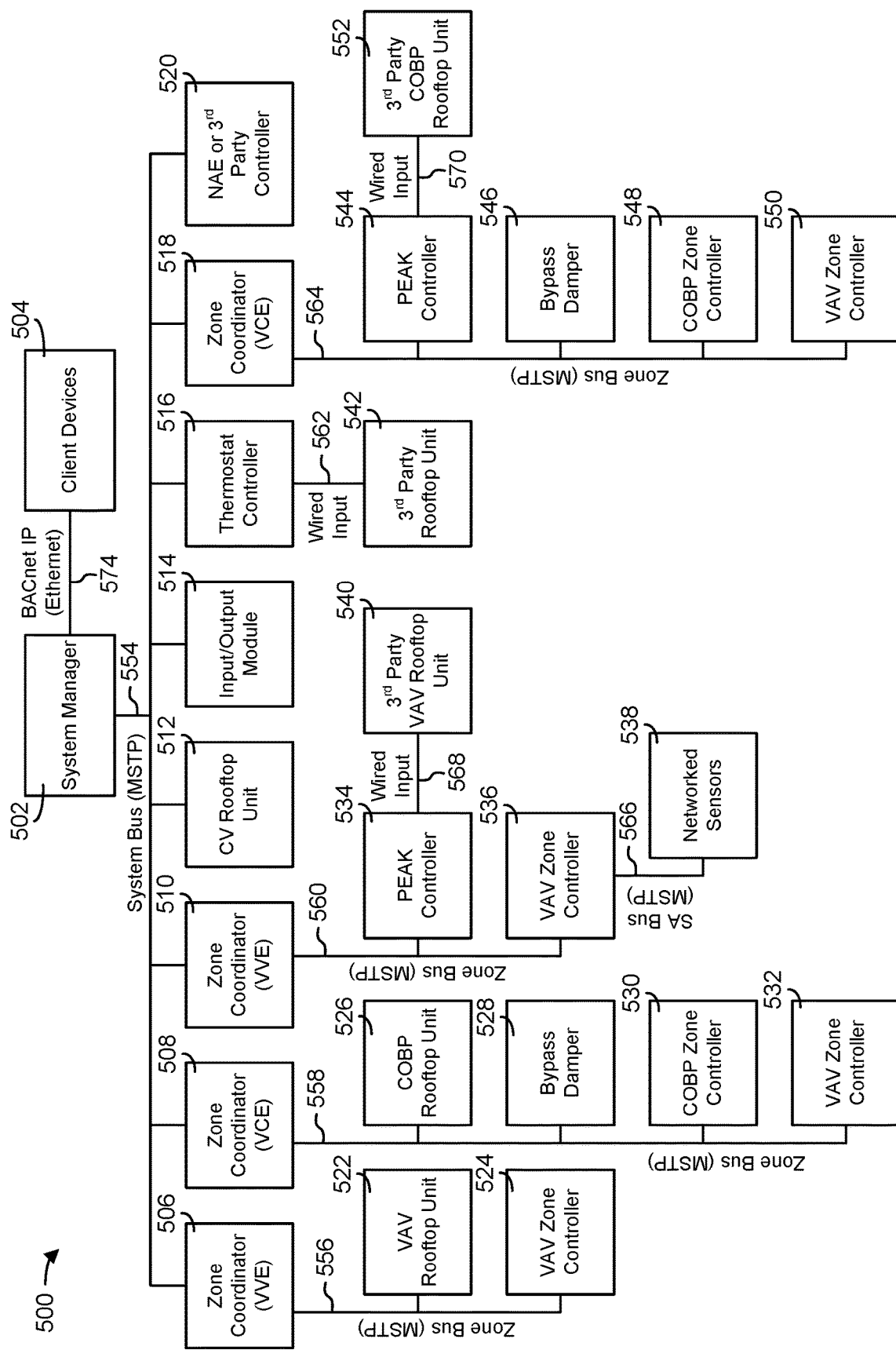
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heated or cooled supply air 310 to a zone of a building by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Volumetric Control Process

Figure 6:
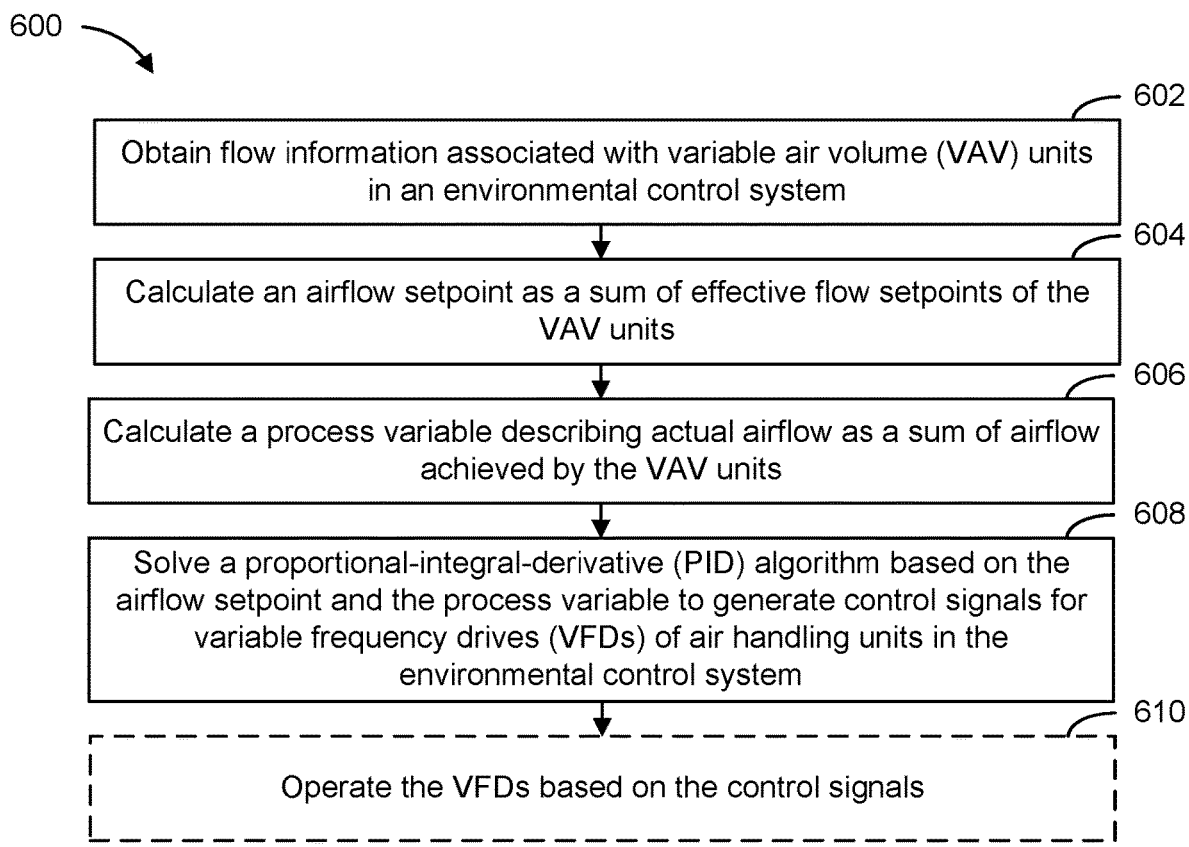
FIG. 6 is a flow diagram of a process for performing a volumetric control process, according to some embodiments.

Referring now to FIG. 6, a process 600 for performing a volumetric control process is shown, according to some embodiments. If considered alone, process 600 can illustrate how control signals for VFDs are operated in a "traditional" volumetric control approach. If performed alone, the volumetric control as described in process 600 may be associated with a variety of deficiencies. In particular, as traditional volumetric control processes may ignore static pressure in a duct, process 600 may result in a high static pressure that results in energy wastage, increased noise, and higher vibrations which may lead to quicker equipment deterioration. Further, process 600 may result in a failure to maintain flow across each VAV in an environmental control system and may lack any control over the duct static pressure.

The deficiencies described above may be present only if process 600 is exclusively performed for generating VFD control signals. To alleviate said deficiencies, process 600 can be performed in tandem with the systems and methods described below with reference to FIGS. 7-10. In other words, the systems and methods described in detail below in FIGS. 7-10 can utilize process 600 (i.e., utilize the volumetric control approach) to generate control signals for VFDs that account for the duct static pressure. In some embodiments, some and/or all steps of process 600 may be performed by a volumetric controller 710 as described in greater detail below with reference to FIG. 7.

It should be noted that process 600 is described with regard to an airside system for sake of example. Process 600 can be similarly applied to other environmental control systems (e.g., to a waterside system). More generally, process 600 can be performed to determine control signals for drive devices of various building devices that help regulate flow of a fluid in a conduit.

Process 600 is shown to include obtaining flow information associated with variable air volume (VAV) units in an environmental control system (step 602). The flow information obtained in step 602 can include information such as an effective flow setpoint of all serving VAVs, an actual air flow achieved by VAVs, etc. The flow information may be obtained directly from measurements from the VAVs, from a database storing flow information, etc.

Process 600 is shown to include calculating an airflow setpoint as a sum of effective flow setpoints of all variable air volume (VAV) units in an environmental control system (step 604). Specifically, step 604 may include performing the following calculation:

$$A_s = \sum_{v \in V} F_v - SP_v$$

where $A_s$ is a target airflow setpoint, v is a VAV unit of a set of VAV units V, $F_v$ is an actual flow delivered by VAV unit v, and $SP_v$ is an effective flow setpoint for VAV unit v. In essence, step 604 may include calculating a sum of effective flow setpoints for all VAV units in V (e.g., all serving VAV units).

Process 600 is shown to include calculating a process variable describing actual airflow as a sum of airflow achieved by the VAV units (step 606). Specifically, step 606 may include performing the following calculation:

$$A_p = \sum_{v \in V} SA_v - F_v$$

where $A_p$ is the process variable describing actual airflow and $SA_v$ is an actual airflow achieved by VAV unit v. In essence, step 606 may include calculating a sum of airflow achieved by all VAV units in V.

Process 600 is shown to include solving a proportional-integral-derivative (PID) algorithm based on the airflow setpoint and the process variable to generate control signals for variable frequency drives (VFDs) of air handling units in the environmental control system (step 608). Step 608 can effectively provide volumetric control for the VFDs. It should be noted that the PID algorithm of step 608 does not directly account for duct static pressure. Accordingly, the control signals generated in step 608 may result in a high static pressure, lack of maintained flow across the VAVs, and/or no direct control over the duct static pressure. In some embodiments, the control signals generated in step 608 are also referred to as "PID outputs" herein.

Process 600 is also shown to include operating the VFDs based on the control signals (step 610). Step 610 is shown as an optional step in process 600 as step 610 may only be applied in a traditional volumetric control approach. Accordingly, if process 600 is being utilized in the control approach described below throughout FIGS. 7-10, step 610 may not be performed as the PID output (i.e., the control signals) may be utilized as a baseline for control signals for the VFDs.

Systems and Methods for Controlling AHU Fan VFD

Referring generally to FIGS. 7-10, systems and methods for operating building devices based on positions of control devices in a conduit are shown and described, according to some embodiments. For example, the systems of methods can be applied to airside systems for operating variable frequency drives (VFDs) of AHUs using a VAV damper position as a proxy for static pressure in a duct. However, the systems and methods described herein are not limited to airside systems. Rather, the systems and methods described herein can be applied to various environmental control systems (e.g., airside systems, waterside systems, etc.). As an example, the systems and methods described herein can be applied to a waterside system. In the waterside system, operation of a pump can be determined based on operating positions of valves in a pipe that regulate water flow through the pipes. Accordingly, it should be appreciated that descriptions provided below that are associated with specific system components (e.g., VAVs, AHUs, air ducts, etc. in an airside system) are provided for sake of example. The systems and methods described herein can be applied to various environmental control systems that are associated with managing static pressure in a conduit that allows flow of a fluid (e.g., air, liquids, etc.).

Utilizing the VAV damper position as the proxy for the duct static pressure can provide a number of advantages for environmental control systems including increased energy savings, reduced noise and vibrations in equipment, indirect control of duct static pressure, etc. The systems and methods described throughout FIGS. 7-10 can leverage the volumetric control process of process 600, as described above with reference to FIG. 6, in determining control signals for VFDs of AHUs. Specifically, the systems and methods described below may utilize the PID output of step 608 to generate actual control signals for the VFDs.

Figure 7:
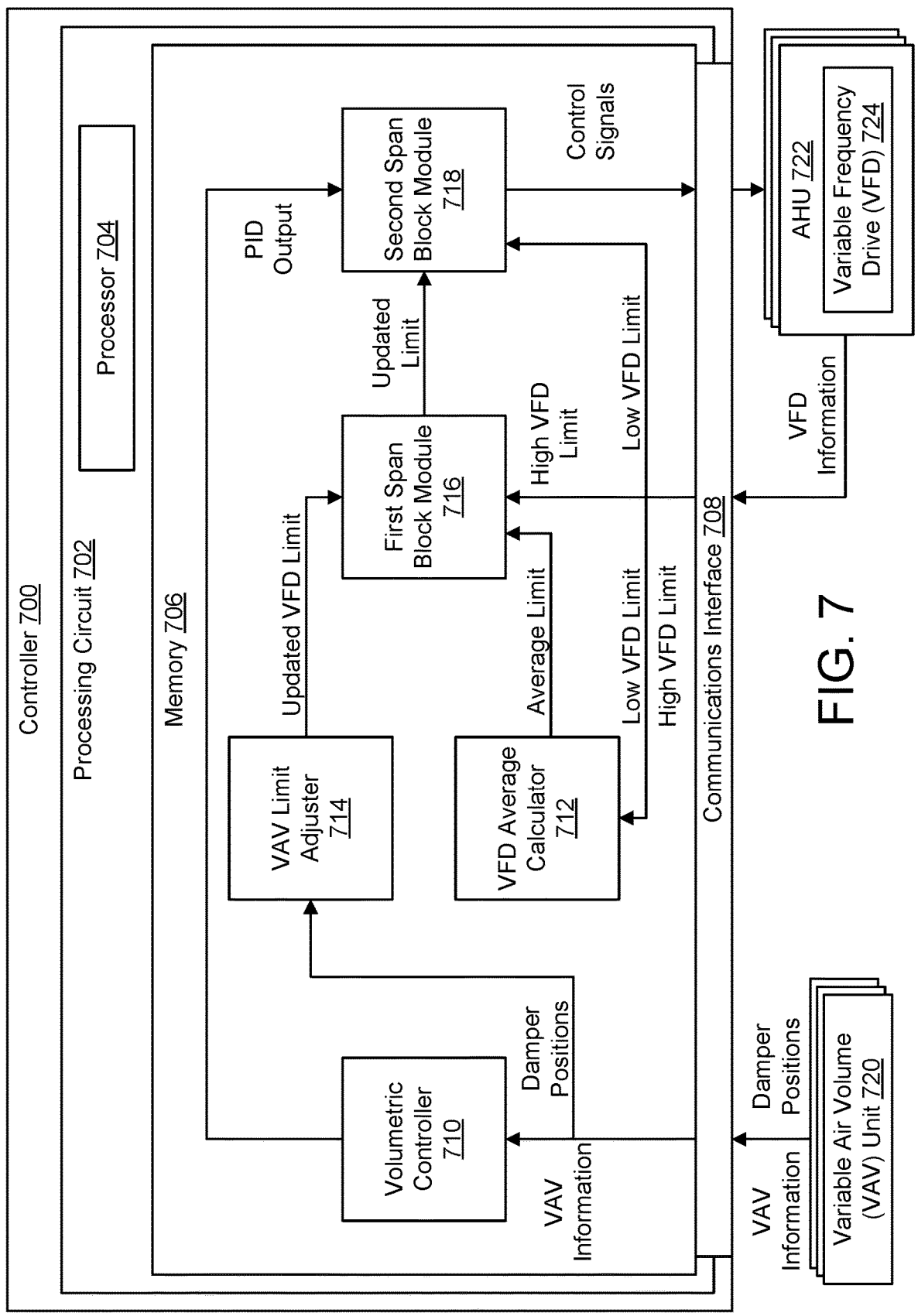
FIG. 7 is a block diagram of an air handling unit (AHU) controller, according to some embodiments.

Referring now to FIG. 7, a controller 700 is shown, according to some embodiments. Controller 700 can be configured to operate VFDs 724 (and thereby AHUs 722) to affect a variable state or condition (e.g., a temperature) of a zone and/or other space of a building (e.g., building 10). Specifically, operate of VFDs 724 may result in fans of AHUs 722 rotating to provide heated and/or cooled air to a zone of a building. In some embodiments, controller 700 is a part of BMS controller 366 as described above with reference to FIGS. 3 and 4. In some embodiments, controller 700 is an independent controller for a building/building system. Accordingly, controller 700 may be implemented in a variety of locations such as, for example, in a thermostat of a zone, on a local computing system for a building, on some computational device that communicates with building equipment (e.g., a desktop computer, a laptop, a smart phone, etc.), on a cloud computing system, etc.

It should be appreciated that while the below descriptions is provided particularly for airside systems including airside components (e.g., AHUs, VAVs, air ducts, etc.), controller 700 can be utilized in other environmental control systems. For example, controller 700 can be utilized in a waterside system for regulating flow of a liquid through a conduit (e.g., a pipe). In this example, controller 700 may utilize an operating position of a valve as a proxy for static pressure in the pipe. Based on the operating position, controller 700 can determine control signals for a drive device (e.g., a VFD, a VSD, etc.) of a pump to affect a flow rate of a liquid through the pipe. As such, descriptions with regard to airside systems should not be interpreted as limiting to possible functionality of controller 700 and/or otherwise limiting on the present disclosure.

Controller 700 is shown to include a communications interface 708 and a processing circuit 702. Communications interface 708 may include wired or wireless interfaces (e.g., jacks, antennas, transmitters, receivers, transceivers, wire terminals, etc.) for conducting data communications with various systems, devices, or networks. For example, communications interface 708 may include an Ethernet card and port for sending and receiving data via an Ethernet-based communications network and/or a Wi-Fi transceiver for communicating via a wireless communications network. Communications interface 708 may be configured to communicate via local area networks or wide area networks (e.g., the Internet, a building WAN, etc.) and may use a variety of communications protocols (e.g., BACnet, IP, LON, etc.).

Communications interface 708 may be a network interface configured to facilitate electronic data communications between controller 700 and various external systems or devices (e.g., VAV units 720, AHUs 722, etc.). For example, controller 700 may receive VAV information and damper positions from VAV units 720 via communications interface 708.

Processing circuit 702 is shown to include a processor 704 and memory 706. Processor 704 may be a general purpose or specific purpose processor, an application specific integrated circuit (ASIC), one or more field programmable gate arrays (FPGAs), a group of processing components, or other suitable processing components. Processor 704 may be configured to execute computer code or instructions stored in memory 706 or received from other computer readable media (e.g., CDROM, network storage, a remote server, etc.).

Memory 706 may include one or more devices (e.g., memory units, memory devices, storage devices, etc.) for storing data and/or computer code for completing and/or facilitating the various processes described in the present disclosure. Memory 706 may include random access memory (RAM), read-only memory (ROM), hard drive storage, temporary storage, non-volatile memory, flash memory, optical memory, or any other suitable memory for storing software objects and/or computer instructions. Memory 706 may include database components, object code components, script components, or any other type of information structure for supporting the various activities and information structures described in the present disclosure. Memory 706 may be communicably connected to processor 704 via processing circuit 702 and may include computer code for executing (e.g., by processor 704) one or more processes described herein. In some embodiments, one or more components of memory 706 are part of a singular component. However, each component of memory 706 is shown independently for ease of explanation.

Memory 706 is shown to include a volumetric controller 710. Volumetric controller 710 can be configured to perform a volumetric control process for AHUs 722. Specifically, volumetric controller 710 may perform some and/or all of the steps of process 600 as described above with reference to FIG. 6.

Volumetric controller 710 is shown to receive VAV information from VAV units 720. The VAV information can include a variety of information describing VAV units 720. For example, the VAV information may include effective flow setpoints for VAV units 720, achieved airflows of VAV units 720, etc. Based on the VAV information, volumetric controller 710 can calculate a target airflow setpoint ($A_s$) and a process variable describing actual airflow ($A_p$) of VAV units 720. To perform said calculations, volumetric controller 710 may utilize the following equations:

$$A_s = \sum_{v \in V} F_v - SP_v$$

$$A_p = \sum_{v \in V} SA_v - F_v$$

Where the summation of $F_v - SP_v$ is the sum of effective flow setpoint of all serving VAV's and the summation of $SA_v - F_v$ is the sum of air flow achieved by all serving VAV's. As a result of calculating ($A_s$) and ($A_p$), volumetric controller 710 can solve a PID algorithm to generate a PID output. Specifically, volumetric controller 710 may calculate an error based on ($A_s$) and ($A_p$). Based on the error, volumetric controller 710 can calculate proportional, integral, and derivative terms that can be used to generate a PID output. The PID output may be defined as a value between 0% and 100%. In some embodiments, the PID output defines initial control signals for VFDs 724. However, control signals included in the PID output do not account for duct static pressure and therefore should not be utilized to operate VFDs 724. Instead, volumetric controller 710 can provide the PID output to a second span block module 718 which is described in greater detail below. In this way, the PID output can be used as a baseline that can be used to generate control signals for VFDs 724 that account for the duct static pressure.

Controller 700 is also shown to include a VFD limit adjuster 714. VFD limit adjuster 714 can adjust/update a setpoint associated with duct static pressure based on damper positions. The damper positions can be received from VAV units 720 via communications interface 708. The setpoint for duct static pressure may be used interchangeably with the phrase "upper limit" herein. In some embodiments, VFD Limit Adjuster 714 can adjust/update upper limit of VFD operating range, based on damper position. In some embodiments, the adjusted/updated "upper limit" may be used interchangeably with the phrase "setpoint for duct static pressure," as described herein.

The duct static pressure setpoint (i.e., the upper limit) can be used to operate VAV units 720 and to determine how VFDs 724 should be operated. More particularly, VFD limit adjuster 714 can adjust the duct static pressure setpoint and determine an updated VFD limit associated with VFDs 724 that achieve the adjusted setpoint. For example, if the duct static pressure setpoint is a pressure value (e.g., in pounds per square inch, pascals, etc.), VFD limit adjuster 714 can determine a correlated frequency and/or voltage setpoint for VFDs 724 (i.e., an updated VFD limit) to achieve the pressure value.

In determining the adjusted setpoint, VFD limit adjuster 714 may determine how many VAV dampers of VAV units 720 are opened at or above a predefined threshold. In this case, a fully open (e.g., 100% open) damper may not significantly impede airflow through the duct whereas a fully closed (e.g., 0% open) damper may effectively stop (or nearly stop) airflow through the duct. Typically, without accounting for other forces, as the VAV dampers close, the static pressure in ducts may rise. Conversely, mostly open (e.g., >85% open) dampers may be associated with a lower static pressure in the ducts as compared to mostly closed (e.g., <85% open) dampers. The predefined threshold can be set by a user, automatically set by VFD limit adjuster 714 and/or another component of controller 700, by an external system/device, etc. For example, the predefined threshold may be automatically set by VFD limit adjuster 714 at 85%. In the example, VFD limit adjuster 714 can determine a number of VAV units 720 that include dampers that are at least 85% open and how many VAV units 720 have dampers that are less than 85% open.

Based on a number of VAV units 720 having dampers open at or above the predefined threshold, VFD limit adjuster 714 can apply an adjustment algorithm to determine the adjusted duct static pressure setpoint (i.e., the adjusted upper limit). In some embodiments, the adjustment algorithm utilizes an upper limit (e.g., a current upper limit) and includes applying one of three cases to the upper limit, described in detail below, based on the number of VAV units 720 having dampers open at or above the predefined threshold. In some embodiments, VFD limit adjuster 714 can determine a VFD setpoint (i.e., a VFD limit as shown in FIG. 7) associated with the upper limit and provide the VFD setpoint to first span block module 716.

In some embodiments, a first case in the adjustment algorithm includes increasing the upper limit by a certain amount at predefined time increments if the number of VAV units 720 having dampers open at or above the predefined threshold is greater than an upper threshold. For example, if the upper threshold is three VAV units 720, VFD limit adjuster 714 may increase the upper limit by 1% every minute if more than three VAV units 720 have dampers open at or above the predefined threshold (e.g., at or above 85% open). As with the predefined threshold described above, the certain amount, the predefined time increments, and the upper threshold can be configurable and adjustable dependent on implementation.

In some embodiments, a second case in the adjustment algorithm includes maintaining the upper limit (i.e., maintaining the duct static pressure setpoint) if the number of VAV units 720 having dampers open at or above the predefined threshold is between a lower threshold and the upper threshold. For example, if the number of VAV units 720 having dampers at least 85% open is between two to three, VFD limit adjuster 714 may maintain the upper limit at a current value. In some embodiments, the second case defines a scenario where airflow in the ducts is appropriate, thereby indicating that a duct static pressure is not too high. As with the upper threshold, the lower threshold can be configured and adjusted dependent on implementation.

In some embodiments, a third case in the adjustment algorithm includes decreasing the upper limit by a second amount at predefined time increments if the number of VAV units 720 having dampers open at or above the predefined threshold is below the lower threshold. For example, if less than two VAV dampers are at least 85% open, VFD limit adjuster 714 may decrease the upper limit by 1% every minute. As should be appreciated, the amount to decrease the upper limit and over what time increments can be configured and adjusted dependent on implementation.

In some embodiments, the amount to decrease the upper limit and the time increment in the third case is the same as the amount to increase the upper limit and the time increment to do so in the first case. For example, the upper limit may be increased or decreased by 1% every minute in the first case and third case, respectively. However, in some embodiments, the first and third cases utilize different adjustment amounts and time increments. For example, the first case may increase the upper limit by 1% every minute whereas the third case may decrease the upper limit by 0.5% every 2 minutes.

Still referring to FIG. 7, memory 706 is shown to include a VFD average calculator 712. VFD average calculator 712 can calculate an average value between a high VFD limit and a low VFD limit. An operating setpoint for VFDs 724 may be constrained by the high VFD limit and the low VFD limit.

The high VFD limit can indicate a maximum frequency and/or voltage that can be applied by VFD 724 whereas the low VFD limit can indicate a minimum frequency and/or voltage that can be applied by VFD 724. For example, the high VFD limit may be set to 120 Hertz (Hz) such that VFD 724 cannot apply a frequency higher than 120 Hz to a fan of AHU 722. The high VFD limit can be set to a value that is within limitations of VFD 724 and/or such that the fan (or some other component of AHU 722) is operated within a range acceptable (e.g., safe) values. For example, the high VFD limit may be set at a value that ensures the fan is not operated at a dangerous number of rotations per minute that can result in malfunctions, rapid degradation of the fan, etc.

With regard to the low VFD limit, the low VFD limit can be selected to maintain a minimum airflow through the duct. In some embodiments, the low VFD limit is zero (e.g., 0 Hz, 0 volts, etc.), thereby indicating that the fan is not required to rotate at some minimum rotational speed. However, in some embodiments, the low VFD limit is greater than zero such that the fan rotates at some minimum speed. For example, the low VFD limit may be set to 10 Hz to meet a building regulation indicating a minimum airflow through ductwork that AHU 722 should operate to achieve.

The high VFD limit and the low VFD limit may be indicated by a user, a manufacturer of VFD 724, AHU 722 itself, etc. Accordingly, the high VFD limit and low VFD limit may be hard-coded into memory 706, included in VFD information obtained from AHU 722, received from a user device, etc. If the high VFD limit and the low VFD limit are set by a user, the user may estimate reasonable values for the high and low VFD limits, may determine values of the high and low VFD limits that ensure building regulations are met, etc. If the high VFD limit and the low VFD limit are provided by a manufacturer, the high and low VFD limits may be hard-coded into memory 706 upon installation of AHUs 722. As should be appreciated, the high VFD limit and the low VFD limit can be obtained from a variety of sources.

It should be noted that the updated VFD limit shown in FIG. 7 may not be the same as the high or low VFD limit. Specifically, the updated VFD limit may be determined based on the adjusted duct static pressure setpoint and constrained by both the high VFD limit and the low VFD limit such that the updated VFD limit cannot exceed the high VFD limit or fall below the low VFD limit. In other words, if execution of the first or third cases described above result in the updated VFD limit exceeding the high VFD limit or falling below the low VFD limit, respectively, the updated VFD limit may inherently take on the value of the high VFD limit or the low VFD limit accordingly.

Based on the high and low VFD limits, VFD average calculator 712 can calculate an average VFD imit. Specifically, VFD average calculator 712 may apply the following equation to calculate the average limit:

$$L_{VFD,avg} = \frac{L_{VFD,low} + L_{VFD,high}}{2}$$

where $L_{VFD,avg}$ is the average VFD limit, $L_{VFD,low}$ is the low VFD limit, and $L_{VFD,high}$ is the high VFD limit. VFD average calculator 712 can provide the average VFD limit to first span block module 716.

In some embodiments, VFD average calculator 712 performs another calculation separate from and/or in addition to the average calculation. For example, VFD average calculator 712 may assign weights to the low VFD limit and the high VFD limit (e.g., based on an estimated level of importance) and calculate the average with respect to the weights. As another example, VFD average calculator 712 may simply provide a value of the low VFD limit to first span block module 716 instead of the average of the low and high VFD limits.

Memory 706 is also shown to include first span block module 716. In the context of the present disclosure, a span block can generate/determine a relationship (e.g., a linear relationship) between a low input/output pair and a high input/output pair. Based on the relationship, the span block can apply an input to the relationship to identify a corresponding output. If the input is between the low and high inputs, the corresponding output can be identified directly based on the relationship (e.g., as a point on a line representing the relationship). However, if the input is less than the low input or is greater than the high input, the span block can determine the corresponding output to be the low output or the high output, respectively. Span blocks are described in greater detail below with reference to FIG. 8. Further, an illustrative example relationship generated by a span block is described in greater detail below with reference to FIG. 9.

With specific regard to first span block module 716, the average limit determined by VFD average calculator 712 can be used as both the low input and the low output of the low input/output pair, the high VFD limit received from AHU 722 (or some other system/device) can be used as both the high input and the high output of the high input/output pair, and the updated VFD limit determined by VFD limit adjuster 714 can be used as an input to first span block module 716.

First span block module 716 can apply a range and extrapolated values (e.g., as defined by the low and high input/output pairs) to the updated VFD limit to produce an updated limit as output. Specifically, first span block module 716 can generate a relationship (e.g., a linear relationship) between the low input/output pair defined by the average limit and the high input/output pair defined by the high VFD limit. Based on the relationship, first span block module 716 can determine an output corresponding to the updated VFD limit provided by VFD limit adjuster 714. If the updated VFD limit is between the low input and the high input, first span block module 716 can determine the corresponding output directly based on the relationship. For example, if the relationship is a linear relationship that can be defined by the equation y=mx+b where y is the corresponding output, x is the input, m is some factor applied to the input, and b is an offset, first span block module 716 can perform a calculation based on the equation. However, if the updated VFD limit is below the low input of the low input/output pair, first span block module 716 may determine the corresponding output to be the low output of the low input/output pair. Similarly, if the updated VFD limit is above the high input of the high input/output pair, first span block module 716 may determine the corresponding output to be the high output of the high input/output pair. First span block module 716 can provide the corresponding output (i.e., the updated limit) to second span block module 718.

Second span block module 718 can determine a second relationship (e.g., linear relationship) between a separate low input/output pair and high input/output pair. In some embodiments, the low input/output pair used by second span block module 718 may define the low input as a predefined value of 0% and the low output as the low VFD limit. In some embodiments, the high input/output pair may define the high input as another predefined value of 100% and the high output as the updated limit provided by first span block module 716. Second span block module 718 can then determine a relationship between the low and high input/output pairs. In some embodiments, the low input and/or the high input are values other than 0% and 100%.

In some embodiments, the input to second span block module 718 is the PID output generated by volumetric controller 710. In this way, the volumetric control process can be utilized to determine a corresponding output that accounts for the duct static pressure. In other words, the PID output can be augmented with respect to the duct static pressure to determine appropriate control signals for VFD 724. If the PID output provided by volumetric controller 710 is between the low input and the high input, second span block module 718 can determine a corresponding output directly based on the second relationship. If the PID output is less than the low input, second span block module 718 can determine the corresponding output (i.e., the control signals for VFD 724) to be the low output. Similarly, if the PID output is greater than the high input, second span block module 718 can determine the corresponding output to be the high output. It should be noted that, if the low input and the high input are 0% and 100%, respectively, the corresponding output may always be directly identifiable based on the second relationship if the PID output is constrained between values of 0% and 100%.

INN The output determined by second span block module 718 can be provided to VFD 724 as control signals. Based on the control signals, VFD 724 can operate to affect a rotational speed of a fan of AHU 722 (e.g., by providing voltage and/or frequency signals to the fan). Affecting the rotational speed of the fan can aid in regulation of environmental conditions (e.g., temperature) in a zone of a building. For example, operation of VFD 724 may result in the fan rotating at optimal speed, thereby arresting over-pressurization in duct, which may be otherwise ignored in traditional volumetric control. If multiple VFDs 724 exist (e.g., due to multiple AHUs 722 being installed for a building), controller 700 can provide the control signals to each VFD 724 to affect airflow in the ductwork.

In some embodiments, VAV units 720 and AHUs 722 can operate in tandem to maintain an acceptable static pressure. In such embodiments, operating VAV units 720 and AHUs 722 in tandem can avoid potential problems that occur in traditional systems where AHU fan VFDs operate to maintain total flow and VAV dampers separately operate to maintain individual flow, which can cause conflicts. Specifically, operating the AHU fan VFDs and VAV dampers separately can result in over-pressurization in the ducts (or other conduits), resulting in energy wastage and disturbed air flow dynamics.

In some embodiments, VFD limit adjuster 714 determines the adjusted upper limit (i.e., the adjusted duct static pressure setpoint) and provides the updated VFD limit to first span block module. In some embodiments, VAV units 720 will operate dampers to achieve the adjusted setpoint. Operating VAV units 720 based on the adjusted upper limit can aid in maintaining the static pressure in the ducts by adjusting a flow rate of air through the ducts. Advantageously, adjusting operation of VAV units 720 can reduce an overall cost of maintaining the static pressure in the ducts. Further, as AHUs 722 can also be operated to affect the flow rate (and thereby the static pressure), VAV units 720 and AHUs 722 can be operated in tandem to maintain an acceptable static pressure. Operating VAV units 720 and AHUs 722 in tandem can avoid potential problems that occur in traditional systems where AHU fan VFDs operate to maintain total flow and VAV dampers separately operate to maintain individual flow which can cause conflicts. Specifically, operating the AHU fan VFDs and VAV dampers separately can result in over-pressurization in the ducts (or other conduits), resulting in energy wastage and disturbed air flow dynamics.

Figure 8:
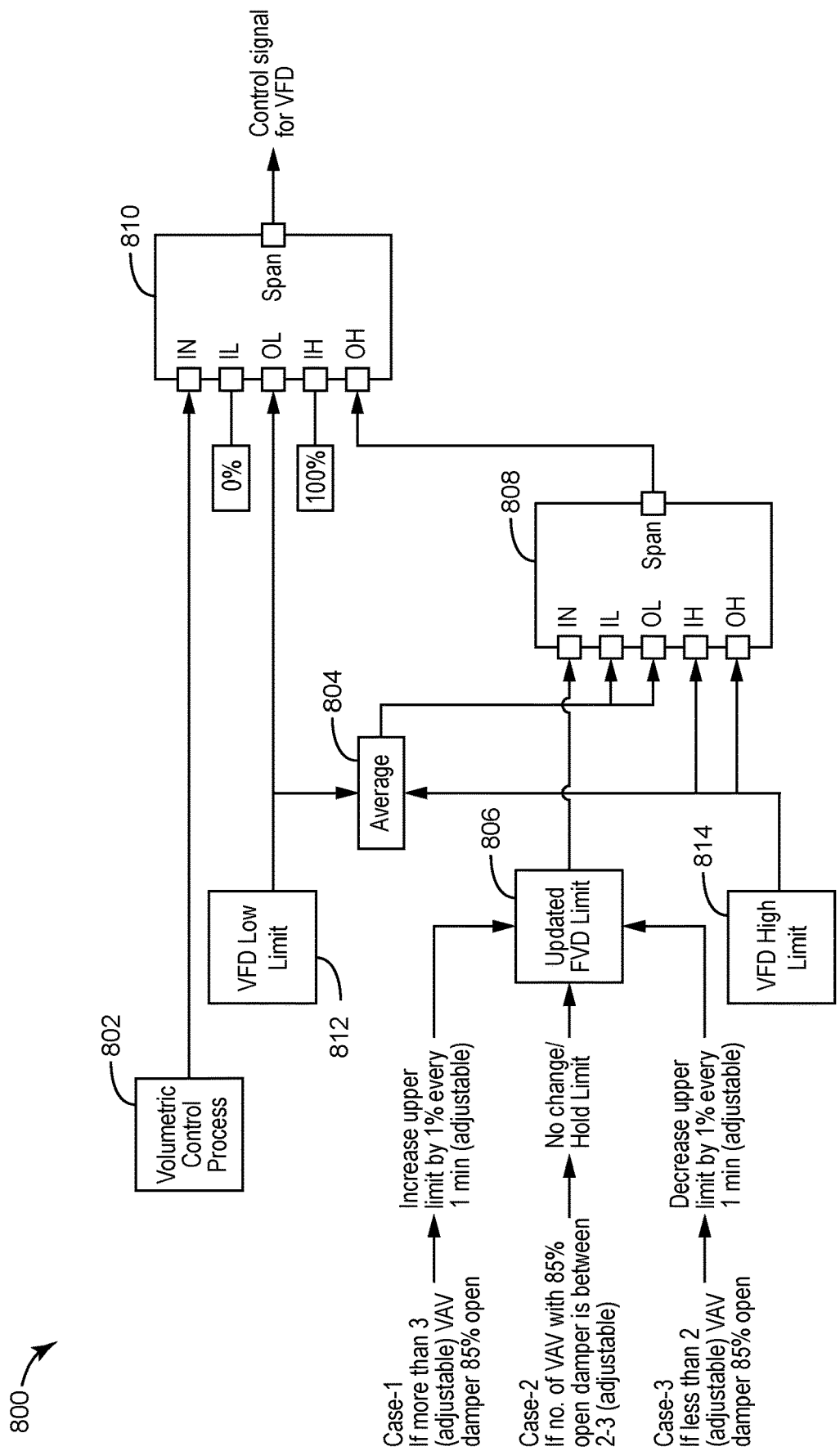
FIG. 8 is a flow diagram illustrating a control process performed by the AHU controller of FIG. 7, according to some embodiments.

Referring now to FIG. 8, a flow diagram illustrating a control process 800 performed by controller 700 is shown, according to some embodiments. Specifically, control process 800 as shown in FIG. 8 can illustrate how variables are utilized by different components of controller 700 to generate control signals for VFDs 724.

Control process 800 is shown to include a volumetric control process block 802. Volumetric control process block 802 can represent the volumetric control process performed by volumetric controller 710. As shown in control process 800, an output of volumetric control process block 802 can be used as input to a second span block 810 that illustrates operation of second span block module 718.

Control process 800 is also shown to include an averaging block 804. Averaging block 804 can illustrate the calculation performed by VFD average calculator 712. Specifically, averaging block 804 can illustrate how an average of a low VFD limit 812 and a high VFD limit 814 can be determined and provided to a first span block 808. In some embodiments, averaging block 804 includes some other calculation separate from and/or in addition to the average calculation. For example, averaging block 804 may simply pass the low VFD limit 812 through to first span block 808.

Control process 800 is shown to include an updated VFD limit block 806. Updated VFD limit block 806 and inputs provided thereto can illustrate the adjustment process performed by VFD limit adjuster 714. As described above with reference to FIG. 7, determining an updated VFD limit can involve executing one of three cases dependent on a number of VAV units having dampers open at or above a predefined threshold. The three cases described below can be used to determine an updated duct static pressure setpoint. Based on the updated duct static pressure setpoint, updated VFD limit block 806 can determine an updated VFD limit associated with the updated duct static pressure setpoint.

A first case shown in control process 800 can be executed if more than three VAV dampers are at least 85% open. Of course, the number of VAV dampers and the 85% threshold are provided for sake of example and can be configured and customized as desired. If the first case is executed, an upper limit (i.e., a duct static pressure setpoint) can be increased by, for example, 1% every minute.

A second case shown in control process 800 can be executed if the number of VAV dampers that are open at least 85% is between two and three. If the second case is executed, the upper limit may be held constant and otherwise be unchanged.

A third case shown in control process 800 can be executed if the number of VAV dampers that are open at least 85% is less than two. If the third case is executed, the upper limit may be decreased, for example, by 1% every minute.

An output of updated VFD limit block 806 may be an updated VFD limit determined based on executing one of the three cases described above. Specifically, the updated VFD limit may be a VFD setpoint (e.g., a frequency/voltage setpoint) that can achieve the updated duct static pressure setpoint. The output of updated VFD limit block 806 can be provided as an input to first span block 808. First span block 808 can illustrate operation of first span block module 716. A low input (IL) and a low output (OL) to first span block 808 are shown to be an output of averaging block 804. A high input (IH) and a high output (OH) to first span block 808 are shown to be high VFD limit 814. As the IL/OL pair and the IH/OH pair have equivalent values, a 1-to-1 linear relationship may be established for first span block 808.

Based on the established relationship, the updated VFD limit provided by updated VFD limit block 806 can be provided as input to first span block 808. First span block 808 can utilize the updated VFD limit and the established relationship to generate an output of an updated VFD limit. The updated limit can be provided to second span block 810 to be used as the high output of second span block 810. In other words, the updated limit may be a maximum bound for a control signal generated by second span block 810. Second span block 810 is also shown in FIG. 8 to utilize a value of 0% as a low input, low VFD limit 812 as a low output, and a value of 100% as a high input. Based on the low and high input/output pairs, second span block 810 can establish a relationship between said pairs. The relationship can be used, in combination with the output of volumetric control process block 802 (i.e., a PID output), to generate the control signal for a VFD. An example relationship is described below with reference to FIG. 9.

Control process 800 can illustrate how the traditional volumetric control process can be leveraged to generate more accurate control signals for VFDs by using VAV damper positions as a proxy for duct static pressure. Adjustments to a duct static pressure setpoint (i.e., the upper limit) over time can be used to determine limits on control signals provided to VFDs. More particularly, the OH of second span block 810 may, at most, be high VFD limit 814 (i.e., the OH of first span block 808). However, the OH of second span block 810 may be lower if the input to first span block 808 is between the IL and IH for first span block 808.

Figure 9:
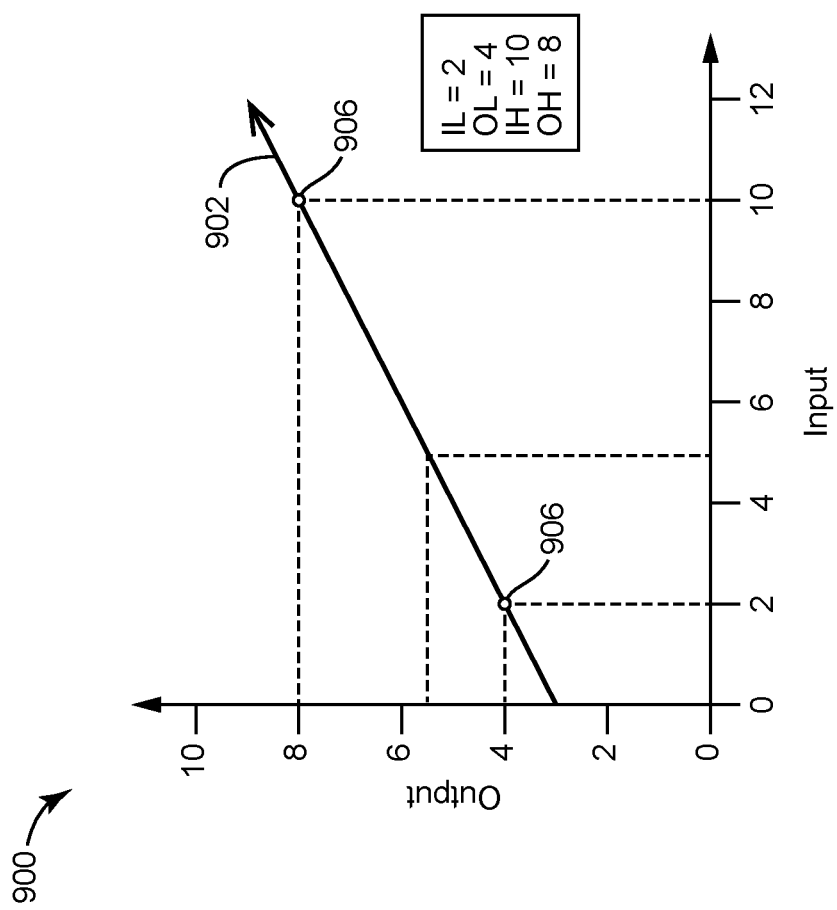
FIG. 9 is a graph illustrating an example relationship that can be generated by a span block, according to some embodiments.

Referring now to FIG. 9, a graph 900 illustrating an example relationship that can be generated by a span block is shown, according to some embodiments. In some embodiments, graph 900 is utilized by first span block module 716 and/or second span block module 718 as described with reference to FIG. 7. Graph 900 is shown to include a regression line 902 that illustrates a relationship that can be established by the span block. Regression line 902 may be identified from a linear regression performed based on a point 904 and a point 906. In graph 900, point 904 can represent a low input/output pair. Specifically, the low input in graph 900 is shown to be 2 whereas the low output is shown to be 4. Similarly, point 906 can illustrate a high input/output pair where the high input is shown to be 10 and the high output is shown to be 8.

Regression line 902 can thereby be established as the line passing through points 904 and 906. Using regression line 902, an input can be applied to determine a corresponding output. For example, if an input of 5 is provided, the input can first be compared to the low input and high input values to ensure the input is properly between said values. As the input of 5 is between the low input of 2 and the high input of 10, regression line 902 can be directly referenced to determine the corresponding output. In particular, the input of 5 can be determined to correspond to an output of 5.5 as shown by regression line 902.

Figure 10:
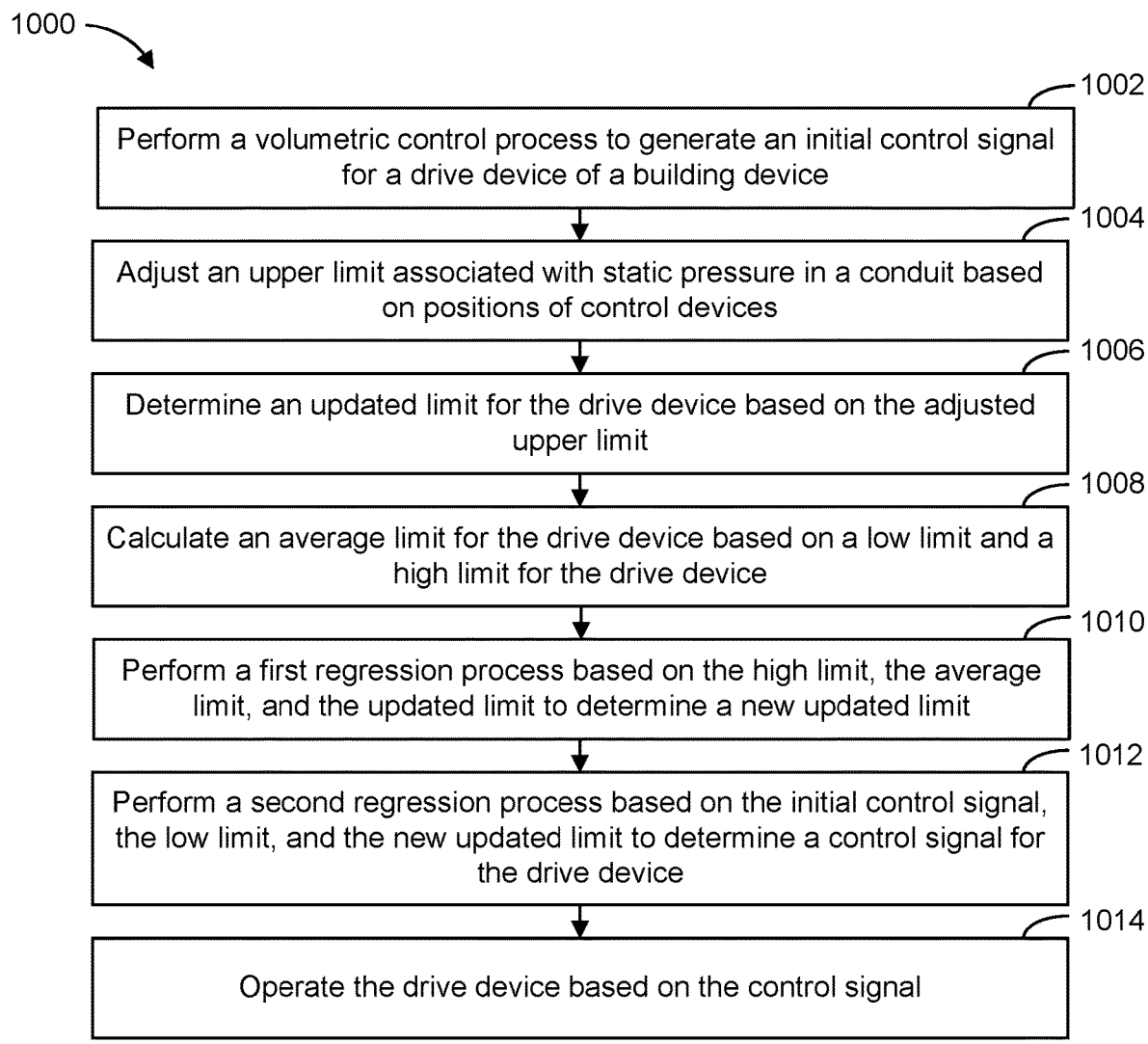
FIG. 10 is a flow diagram of a process for controlling a building device using positions of a control device as a proxy for static pressure in a conduit, according to some embodiments.

Referring now to FIG. 10, a process 1000 for controlling a building device using positions of a control device as a proxy for static pressure in a conduit is shown, according to some embodiments. Process 1000 can be applied to various environmental control systems. For example, process 1000 may be applied to an airside system where the building device is an AHU including a fan, the control device is a VAV damper, and the conduit is a duct that provides air to a zone. As another example, process 1000 may be applied to a waterside system where the building device is a pump, the control device is a valve position, and the conduit is a pipe that provides water. In some embodiments, some and/or all of the steps of process 1000 are performed by components of controller 700.

Process 1000 is shown to include performing a volumetric control process to generate an initial control signal for a drive device of a building device (step 1002). For example, step 1002 may generate initial control signals for a VFD of an AHU. In some embodiments, step 1002 is performed for multiple drive devices (e.g., VFDs, VSDs, etc.) of various building devices (e.g., AHUs, pumps, etc.), thereby resulting in multiple control signals being generated. In some embodiments, step 1002 includes performing some and/or all of the steps of process 600 as described with reference to FIG. 6. As such, the output of step 1002 may be control signals (e.g., a PID output) that can be used to operate the drive devices, but does not account for static pressure in the conduit. The output of step 1002 may be a value between 0% and 100% that is associated with a minimum and maximum frequency and/or voltage that can be applied by the drive devices. In some embodiments, step 1002 is performed by volumetric controller 710.

Process 1000 is shown to include adjusting an upper limit associated with static pressure in a conduit based on positions of control devices (step 1004). The upper limit described in step 1004 can describe a setpoint for static pressure in the conduit. For example, the upper limit may describe a setpoint for static pressure in ductwork. In some embodiments, adjusting the upper limit includes executing one of three cases based on a number of control devices open above some predefined threshold. A first case may include increasing the upper limit if the number of control devices is above a maximum limit. For example, if more than three of the control devices are open at or above 85%, the upper limit may be increased by 1% every minute. A second case may include keeping the upper limit constant if the number of control devices are within a predefined range. For example, if the number of control devices open at or above 85% is between two and three, the upper limit can be held constant. A third case may include decreasing the upper limit if the number of control devices are below a minimum limit. For example, if the number of control devices open at or above 85% is less than two, the upper limit can be decreased by 1% every minute. In some embodiments, step 1004 is performed by VFD limit adjuster 714.

Process 1000 is shown to include determining an updated limit for the drive device based on the adjusted upper limit (step 1006). A limit for the drive device may be used to achieve the adjusted upper limit. For example, in an airside system, the updated limit may be an updated limit for a VFD used to achieve a duct static pressure setpoint. The updated limit can be determined based on a model for the drive device that correlates a limit for the drive device to the upper limit associated with static pressure in the conduit. In some embodiments, step 1006 is performed by VFD limit adjuster 714.

Process 1000 is shown to include calculating an average limit for the drive device based on a low limit and a high limit for the drive device (step 1008). The low and high limits for the drive device can be provided by a user, by the drive device itself, by a manufacturer, etc. The low and high limits can described a minimum and a maximum operating setpoint for the drive device, respectively. For example, the low and high limits may describe a minimum rotations per minute (RPM) and a maximum RPM for the drive device. In some embodiments, step 1008 includes performing a calculation other than and/or in addition to an averaging calculation. For example, step 1008 may include simply providing the low limit as an output of step 1008. In some embodiments, step 1008 is performed by VFD average calculator 712.

Process 1000 is shown to include performing a first regression process based on the high limit, the average limit, and the updated limit to determine a new updated limit (step 1010). The first regression process can include performing a regression (e.g., a linear regression) to establish a relationship between the high limit and the average limit. Specifically, the regression can be performed using the average limit as a low input/output pair and the high limit as a high input/output pair. The updated limit can be applied to the relationship to determine a corresponding output that describes the new updated limit. In this case, the new updated limit can describe a maximum value of a control signal for the drive device that accounts for the positions of the control devices. For example, in an airside system, the new updated limit can describe a maximum value for operating a VFD that accounts for VAV damper positions. In some embodiments, step 1010 is performed by first span block module 716.

Process 1000 is shown to include performing a second regression process based on the initial control signal, the low limit, and the new updated limit to determine a control signal for the drive device (step 1012). Similar to step 1010, step 1012 can include establishing a relationship between a low input/output pair and a high input/output pair. The low input/output pair may include the low limit as the low output and a predefined value (e.g., 0%) as the low input. The high input/output pair may include the new updated limit as the high output and a second predefined value (e.g., 100%) as the high input. The initial control signal can be applied to the relationship established in step 1012 to generate the control signal for the drive device. In some embodiments, step 1012 is performed by second span block module 718.

Process 1000 is shown to include operating the drive device based on the control signal (step 1014). By operating the drive device, a variable state or condition (e.g., a temperature) of a zone of a building may be affected. For example, in an airside system, operating a VFD (i.e., the drive device) of an AHU may result in cooled air being provided to the zone, thereby decreasing a temperature of the zone. As another example, in a waterside system, operating a VFD of a pump may result in additional cooled/ heated water being provided to the zone and/or other building devices, thereby affecting the temperature of the zone. In some embodiments, step 1014 is performed by second span block module 718.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An environmental control system for a building, the system comprising:
a control device operable to affect a static pressure within a conduit;
a building device operable to affect a flow rate of a fluid through the conduit, the building device comprising a drive device that affects operation of the building device; and
a controller comprising a processing circuit configured to:
perform a volumetric control process to generate a control signal for the drive device;
receive an operating position signal of the control device indicating a current position of the control device within the conduit;
determine an estimated static pressure level within the conduit using the current position of the control device within the conduit without requiring a measurement of the estimated static pressure level, wherein determining the estimated static pressure level comprises (i) determining a first estimated static pressure level when the control device is in a first position within the conduit without requiring a measurement of the first estimated static pressure level and (ii) determining a second estimated static pressure level different from the first estimated static pressure level when the control device is in a second position within the conduit different from the first position without requiring a measurement of the second estimated static pressure level, wherein at least one of the first position or the second position is an intermediate position between a fully open position and a fully closed position;
update the control signal based on the estimated static pressure level within the conduit determined using the current position of the control device within the conduit; and
operate the drive device based on the updated control signal to affect the flow rate of the fluid.

2. The system of claim 1, wherein:
the control device is a damper of a variable air volume unit or a valve;
the building device is an air handling unit or a pump; and
the fluid is a gas or a liquid.

3. The system of claim 1, wherein the updating of the control signal based on the estimated static pressure level within the conduit further comprises:
establishing a plurality of static pressure ranges based on a plurality of open control devices, the plurality of open control devices comprising the control device;
determining whether the received operating position signal is indicative of the control device being open;
associating the indication of the control device being open with one of the plurality of static pressure ranges in which the building device operates; and
adjusting the control signal based on the building device operating in the one of the plurality of static pressure ranges.

4. The system of claim 1, wherein the updating of the control signal based on the estimated static pressure level within the conduit further comprises:
a plurality of static pressure ranges based on a plurality of open control devices, the plurality of open control devices comprising the control device;
determining a percentage to which the control device has been opened based on the received operating position signal;
associating the percentage to which the control device has been opened with one of the plurality of static pressure ranges in which the building device operates; and adjusting the control signal based on the building device operating in the one of the plurality of static pressure ranges.

5. The system of claim 1, wherein the processing circuit is further configured to:
perform a regression to identify a relationship between a low input/output (I/O) pair and a high I/O pair associated with the building device, wherein the low I/O pair and the high I/O pair describe a minimum value and a maximum value of the control signal for the building device; and
update the control signal based on the relationship.

6. The system of claim 1, wherein the processing circuit is further configured to:
increase a setpoint associated with the estimated static pressure level within the conduit in response to determining that a number of control devices opened above a predefined threshold exceeds a maximum limit;
decrease the setpoint in response to determining that the number of control devices is below a minimum limit; and
maintain the setpoint in response to determining the number of control devices is between the minimum limit and the maximum limit;
wherein the control signal is updated further based on the setpoint.

7. The system of claim 6, wherein the processing circuit is further configured to operate the control device based on the setpoint to affect the estimated static pressure level within the conduit, wherein the current position of the control device within the conduit acts as a proxy for the estimated static pressure level within the conduit.

8. The system of claim 1, wherein:
the control signal indicates at least one of a frequency value or a voltage value; and
the drive device provides the at least one of the frequency value or the voltage value to a component of the building device to affect a rotational speed of the component.

9. A method for affecting a flow rate of a fluid through a conduit, the method comprising:
performing a volumetric control process to generate a control signal for a drive device of a building device, the building device operable to affect the flow rate of the fluid through the conduit;
receiving an operating position signal of a control device indicating a current position of the control device within the conduit;
determining an estimated static pressure level within the conduit using the current position of the control device within the conduit without requiring a measurement of the estimated static pressure level, wherein determining the estimated static pressure level comprises (i) determining a first estimated static pressure level when the control device is in a first position within the conduit without requiring a measurement of the first estimated static pressure level and (ii) determining a second estimated static pressure level different from the first estimated static pressure level when the control device is in a second position within the conduit different from the first position without requiring a measurement of the second estimated static pressure level, wherein at least one of the first position or the second position is an intermediate position between a fully open position and a fully closed position;
updating the control signal based on the estimated static pressure level within the conduit determined using the current position of the control device within the conduit; and
operating the drive device based on the updated control signal to affect the flow rate of the fluid.

10. The method of claim 9, wherein:
the control device is a variable air volume damper or a valve;
the building device is an air handling unit or a pump; and
the fluid is a gas or a liquid.

11. The method of claim 9, wherein the updating of the control signal based on the estimated static pressure level within the conduit further comprises:
establishing a plurality of static pressure ranges based on a plurality of open control devices, the plurality of open control devices comprising the control device;
determining whether the received operating position signal is indicative of the control device being open;
associating the indication of the control device being open with one of the plurality of static pressure ranges in which the building device operates; and
adjusting the control signal based on the building device operating in the one of the plurality of static pressure ranges.

12. The method of claim 9, wherein the updating of the control signal based on the estimated static pressure level within the conduit further comprises:
a plurality of static pressure ranges based on a plurality of open control devices, the plurality of open control devices comprising the control device;
determining a percentage to which the control device has been opened based on the received operating position signal;
associating the percentage to which the control device has been opened with one of the plurality of static pressure ranges in which the building device operates; and
adjusting the control signal based on the building device operating in the one of the plurality of static pressure ranges.

13. The method of claim 9, further comprising:
performing a regression to identify a relationship between a low input/output (I/O) pair and a high I/O pair associated with the building device, wherein the low I/O pair and the high I/O pair describe a minimum value and a maximum value of the control signal for the building device; and
updating the control signal based on the relationship.

14. The method of claim 9, further comprising:
increasing a setpoint associated with the estimated static pressure level within the conduit in response to determining that a number of control devices opened above a predefined threshold exceeds a maximum limit;
decreasing the setpoint in response to determining that the number of control devices is below a minimum limit; and
maintaining the setpoint in response to determining the number of control devices is between the minimum limit and the maximum limit;
wherein the control signal is updated further based on the setpoint.

15. The method of claim 14, further comprising operating the control device based on the setpoint to affect the estimated static pressure level within the conduit, wherein the current position of the control device within the conduit acts as a proxy for the estimated static pressure level within the conduit.

16. The method of claim 9, wherein:
the control signal indicates at least one of a frequency value or a voltage value; and
the drive device provides the at least one of the frequency value or the voltage value to a component of the building device to affect a rotational speed of the component.

17. A controller for affecting a flow rate of a fluid through a conduit, the controller comprising:
one or more processors; and
one or more non-transitory computer-readable media storing instructions that, when executed by the one or more processors, cause the one or more processors to perform operations comprising:
performing a volumetric control process to generate a control signal for a drive device of a building device, the building device operable to affect the flow rate of the fluid through the conduit;
receiving an operating position signal of a control device indicating a current position of the control device within the conduit;
determining an estimated static pressure level within the conduit using the current position of the control device within the conduit without requiring a measurement of the estimated static pressure level, wherein determining the estimated static pressure level comprises (i) determining a first estimated static pressure level when the control device is in a first position within the conduit without requiring a measurement of the first estimated static pressure level and (ii) determining a second estimated static pressure level different from the first estimated static pressure level when the control device is in a second position within the conduit different from the first position without requiring a measurement of the second estimated static pressure level, wherein at least one of the first position or the second position is an intermediate position between a fully open position and a fully closed position;
updating the control signal based on the estimated static pressure level within the conduit determined using the current position of the control device within the conduit; and
operating the drive device based on the updated control signal to affect the flow rate of the fluid.

18. The controller of claim 17, wherein:
the control device is a variable air volume damper or a valve;
the building device is an air handling unit or a pump; and
the fluid is a gas or a liquid.

19. The controller of claim 17, wherein the updating of the control signal based on the estimated static pressure level within the conduit further comprises:
establishing a plurality of static pressure ranges based on a plurality of open control devices, the plurality of open control devices comprising the control device;
determining whether the received operating position signal is indicative of the control device being open;
associating the indication of the control device being open with one of the plurality of static pressure ranges in which the building device operates; and
adjusting the control signal based on the building device operating in the one of the plurality of static pressure ranges.

20. The controller of claim 17, wherein the updating of the control signal based on the estimated static pressure level within the conduit further comprises:
a plurality of static pressure ranges based on a plurality of open control devices, the plurality of open control devices comprising the control device;
determining a percentage to which the control device has been opened based on the received operating position signal;
associating the percentage to which the control device has been opened with one of the plurality of static pressure ranges in which the building device operates; and
adjusting the control signal based on the building device operating in the one of the plurality of static pressure ranges.

* * * * *